United States Patent
Beck

(10) Patent No.: US 6,672,438 B2
(45) Date of Patent: Jan. 6, 2004

(54) CRASH BOX COLLISION DAMPER FOR MOTOR VEHICLE

(75) Inventor: Manfred Beck, Seligenstadt (DE)

(73) Assignee: Wagon Automotive GmbH, Waldaschaff (DE)

(*) Notice: Subject to any disclaimer, the term of this patent is extended or adjusted under 35 U.S.C. 154(b) by 13 days.

(21) Appl. No.: 10/108,821

(22) Filed: Mar. 28, 2002

(65) Prior Publication Data

US 2002/0158384 A1 Oct. 31, 2002

(30) Foreign Application Priority Data

Mar. 28, 2001 (DE) .......................... 101 15 512

(51) Int. Cl.$^7$ ............................................. B62D 27/04
(52) U.S. Cl. ........................................ 188/377; 293/133
(58) Field of Search .............................. 293/168, 120, 293/132, 133; 188/371–378

(56) References Cited

U.S. PATENT DOCUMENTS

| | | | |
|---|---|---|---|
| 3,564,688 A | 2/1971 | Gain | 29/155 |
| 3,782,769 A * | 1/1974 | Fader et al. | 293/88 |
| 3,983,963 A * | 10/1976 | Nakamura | 74/492 |
| 3,995,901 A * | 12/1976 | Filbert, Jr. et al. | 293/88 |
| 5,584,518 A | 12/1996 | Frank et al. | 293/155 |
| 5,727,826 A | 3/1998 | Frank et al. | 293/102 |
| 5,772,267 A | 6/1998 | Heim et al. | 293/133 |
| 6,003,930 A | 12/1999 | Frank et al. | 296/133 |
| 6,174,009 B1 | 1/2001 | McKeon | 293/133 |
| 6,416,094 B1 * | 7/2002 | Cherry | 293/120 |
| 6,481,690 B2 * | 11/2002 | Kariatsumari et al. | 253/155 |
| 2002/0101086 A1 * | 8/2002 | Koch et al. | 293/133 |

FOREIGN PATENT DOCUMENTS

| | | |
|---|---|---|
| DE | 2263977 | 7/1974 |
| DE | 2636696 | 2/1978 |
| DE | 4127597 | 9/1992 |
| DE | 4401865 | 8/1994 |
| DE | 19522575 | 1/1996 |
| DE | 19829566 | 2/1999 |
| DE | 19807158 | 8/1999 |
| DE | 19814842 | 10/1999 |
| DE | 19832114 | 1/2000 |
| FR | 2238869 | 2/1975 |
| JP | 11208392 | 8/1999 |
| WO | WO 97/03865 | 2/1997 |

OTHER PUBLICATIONS

Uchimitsu Masanori, Attachment Structure for Bumper, Patent Abstracts Of Japan, JP60121147A, vol. 009, No. 279 (Nov. 7, 1985).

Touchi Kouichi, Car Frame, Patent Abstracts Of Japan, JP58073475A, vol. 007, No. 169 (May 2, 1983).

* cited by examiner

*Primary Examiner*—Christopher P. Schwartz
(74) *Attorney, Agent, or Firm*—Andrus, Sceales, Starke & Sawall, LLP

(57) ABSTRACT

An automotive crashbox damper member (26) has a sequenced pre-collapse surface (34) providing sequential energy absorbing compression such that at application of longitudinal (28) force, longitudinal compression initially occurs at the pre-collapse surface (34), prior to compression of the remainder (36) of the crashbox damper member (26). In one embodiment, the pre-collapse surface (34) is a mounting surface (7) beveled (40) in roof-like fashion to a frontmost leading edge (38) over the end (32) of the crashbox damper member (26). In another embodiment, the pre-collapse surface (34) is a mounting surface (7) formed as an arched cap (11) in the form of a spherical segment over the end (32) of the crashbox damper member (26).

14 Claims, 4 Drawing Sheets

CRASH BOX COLLISION DAMPER FOR MOTOR VEHICLE

CROSS-REFERENCE TO RELATED APPLICATION

This application claims priority from German Patent Application No. DE 10115512.3, filed Mar. 28, 2001, incorporated herein by reference.

BACKGROUND AND SUMMARY

The invention relates to a collision damping arrangement for motor vehicles for absorbing energy in a collision of a motor vehicle with an obstacle.

Collision damping arrangements of the type herein are used for the protection of passengers of a motor vehicle during a collision, including head-on, rear end, and side collision. Energy released by the collision is absorbed and transferred to the passenger compartment in reduced form, or not at all. Such collision damping arrangements typically include a crashbox damping member between a bumper member and damping longitudinal members. The longitudinal members are connected to the passenger compartment and longitudinally absorb energy. The bumper member is typically a bumper-side cross member, the so-called bumper cross member, and extends perpendicularly to the longitudinal members. The crashbox damper member is located between the bumper and the longitudinal member and is longitudinally deformably compressible in response to longitudinal force application, to absorb collision energy, particularly at low speed, without deformation of the longitudinal member, to minimize frequency of replacement of the latter, which is expensive. The present invention is directed to improvements in the noted intermediate crashbox damper member.

As is known in the art, an important task of the bumper cross member during a collision is to ensure a tensile connection between the right and left side of the vehicle body in order to provide the best possible protection for the passengers. The collision damping arrangement provided by crashbox damper members between the longitudinal members and the bumper cross members must therefore realize a connection between the pertinent members with sufficient tensile strength as well as the desired energy absorption by means of deformation. The requirements regarding the material and design of such collision damping arrangements are therefore considerable. Such collision damping arrangements are typically made of metal, such as steel, aluminum, magnesium, or suitable alloys. Different types of steel, including high tensile steel appropriately formed, are often used. Automotive collision damping arrangements for energy absorption can also be used for side collisions, within structures generally referred to as side impact systems, for example where the bumper is in a door side panel. The area of the automotive B column and possibly the C column could be of interest with regard to arranging the collision damping arrangement. Collision damping arrangements of the present type can also be used inside the passenger compartment, for example as support arrangements for kneepads.

The function and effect of a collision damping arrangement is primarily determined by the course of the force path, wherein considerable significance is attributed to the onset of the deformation. Complex movements of the bumper occur in particular in the case of a laterally shifted head-on collision which the design of the collision damping arrangement must taken into account. If the mounting surfaces in the arrangement are arranged parallel to one another, then the adaptation to the complex arched course of the bumper cross member or strake must be accomplished in another way. A known solution is to include bumper cross members having various cross-sections or wedge/arch-shaped compensating elements inserted between the bumper cross member and the collision damper member and then welded or bolted, for example EP 0718157A1, EP 0718158A1. It is also known to provide a collision damping arrangement in which the mounting surface for the bumper cross member and the mounting surface for the vehicle longitudinal member are not arranged parallel to each other, but at an acute angle, for example 15°, DE 19829566A1. This design accounts for the strake in the collision damper itself.

It is also known to hinge a collision damper to the bumper cross member by means of a pin bearing, DE 19832114A1. This solution has the advantage that the angle between the bumper cross member and the front head side of the collision damper does not need to be determined in advance, and may also change in the event of a collision, without the connection between the bumper cross member and the collision damper being severed. However, such a pin bearing presents problems with regard to the technology of the connection and the rigidity of the bumper cross member. In addition, the force conductance by means of the pins into the collision damper is not optimal.

The angle between the bumper cross member and the head surface of the collision damper changes in the case of a laterally shifted head-on collision because the bumper cross member is first pushed in strongly in the center, and only then an essentially uniform deformation across the full width of the hit area in the longitudinal direction follows. In the case of known collision dampers, it may happen that the force component perpendicular to the longitudinal direction, or other lateral force component, is so large at the very onset of the head-on collision that the bumper cross member is severed from the collision damper or that the collision damper gives way laterally. If this occurs, the collision damper loses its effect already at the onset of the head-on collision, an effect which should only begin afterwards for the protection of the passenger compartment.

The present invention provides an automotive collision damping arrangement which is optimized with regard to its characteristics in the case of a collision, including in the case of a laterally shifted head-on collision.

In one aspect of the invention, in particular in the case of a laterally shifted head-on collision, the bumper cross member, arched in accordance with the strake, is selectively deformed in the longitudinal direction on the side facing the inner side of the vehicle body, where the force is applied first or is strongest at the onset, without the main part of the crashbox damper member being deformed at this time. The preliminary path realized according to the invention ensures that in the case of a laterally shifted head-on collision, the forward mounting surface of the crashbox damper member initially arranged at an acute angle to the rear mounting surface lines up parallel or approximately parallel to the lead mounting surface. At the onset of deformation, the collision damping arrangement remains intact, and its deformation in the longitudinal direction for the purpose of energy absorption starts only after the bumper cross member has been considerably deformed toward the inside in the particularly vulnerable area towards the center of the vehicle body. The function of the crashbox collision damper is retained even in the case of a laterally shifted head-on collision, and the passenger compartment remains optimally protected.

In a coordinated alternative of the doctrine of the invention, the forward mounting surface of the crashbox damper member on the bumper cross member is shaped so that the opposing facing surface on the bumper cross member can be arranged at a considerable angle range without problem. Instead of a pin bearing used in the prior art, a bearing based on a cap in the form of a spherical segment or arch in a similar fashion is used. The bumper cross member may be axially bolted or welded without problem. The base of the cap in the transition to the remainder of the crashbox damper member aft thereof is a fold which permits asymmetrical buckling, with the remainder of the crashbox damper member aft thereof remaining intact at initial force application in the case of a laterally shifted head-on collision in a similar fashion as noted above. The result of this asymmetrical buckling or sinking of the cap into the body of the hollow crashbox damper member is that the fixed connection between the bumper cross member and the crashbox damper member is not severed, but instead is retained even in the case of a laterally shifted head-on collision.

DETAILED DESCRIPTION OF T HE INVENTION

Figure 1:
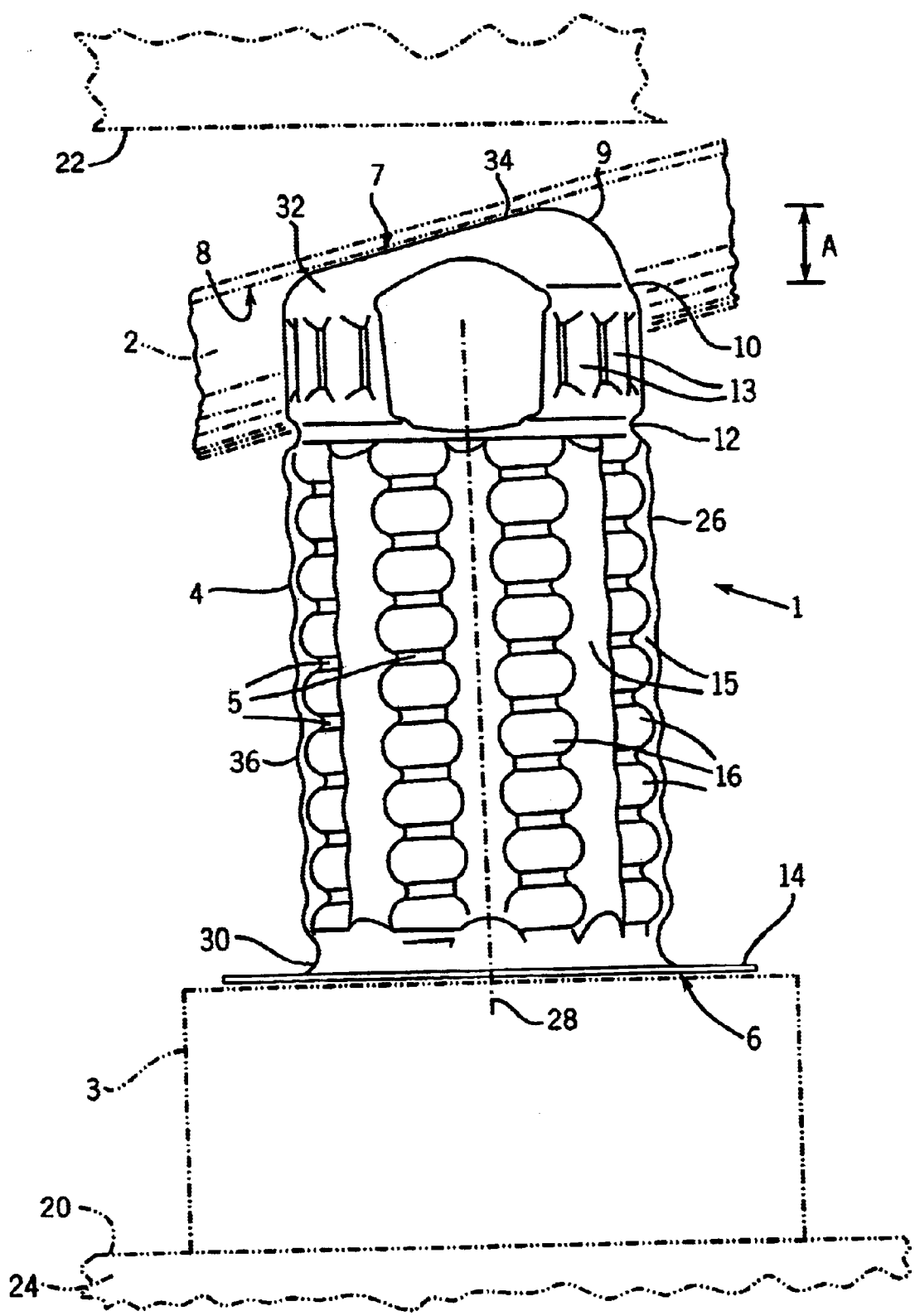
FIG. 1 illustrates a collision damping arrangement in accordance with the invention, including a section of a bumper cross member at a motor vehicle body in connection with a collision damper and a vehicle longitudinal member.

As noted in the above general description, the collision damping arrangement 1, FIG. 1, is intended for use in motor vehicles for the purpose of energy absorption in the case of a collision of the vehicle 20 with an obstacle 22. The collision damping arrangement 1 may be arranged at various locations in the vehicle, such as front, rear, or the sides. The task of the collision damping arrangement is to absorb as much motion energy as possible during a collision and convert it into deformation work, so that damage to the passenger compartment 24 of the vehicle body is kept to a minimum. In FIG. 1, collision damping arrangement 1 is used for energy absorption in the case of a head-on collision of the vehicle with an obstacle. The collision damping arrangement includes crashbox damper member 26 arranged between front bumper cross member 2 and the vehicle longitudinal member 3 at the front side of the latter. Longitudinal member 3 extends in the longitudinal direction of the vehicle and is connected to the passenger compartment 24. Crashbox damper member 26 is customarily made of metal, in particular steel, and if necessary also of an aluminum alloy.

Figure 2:
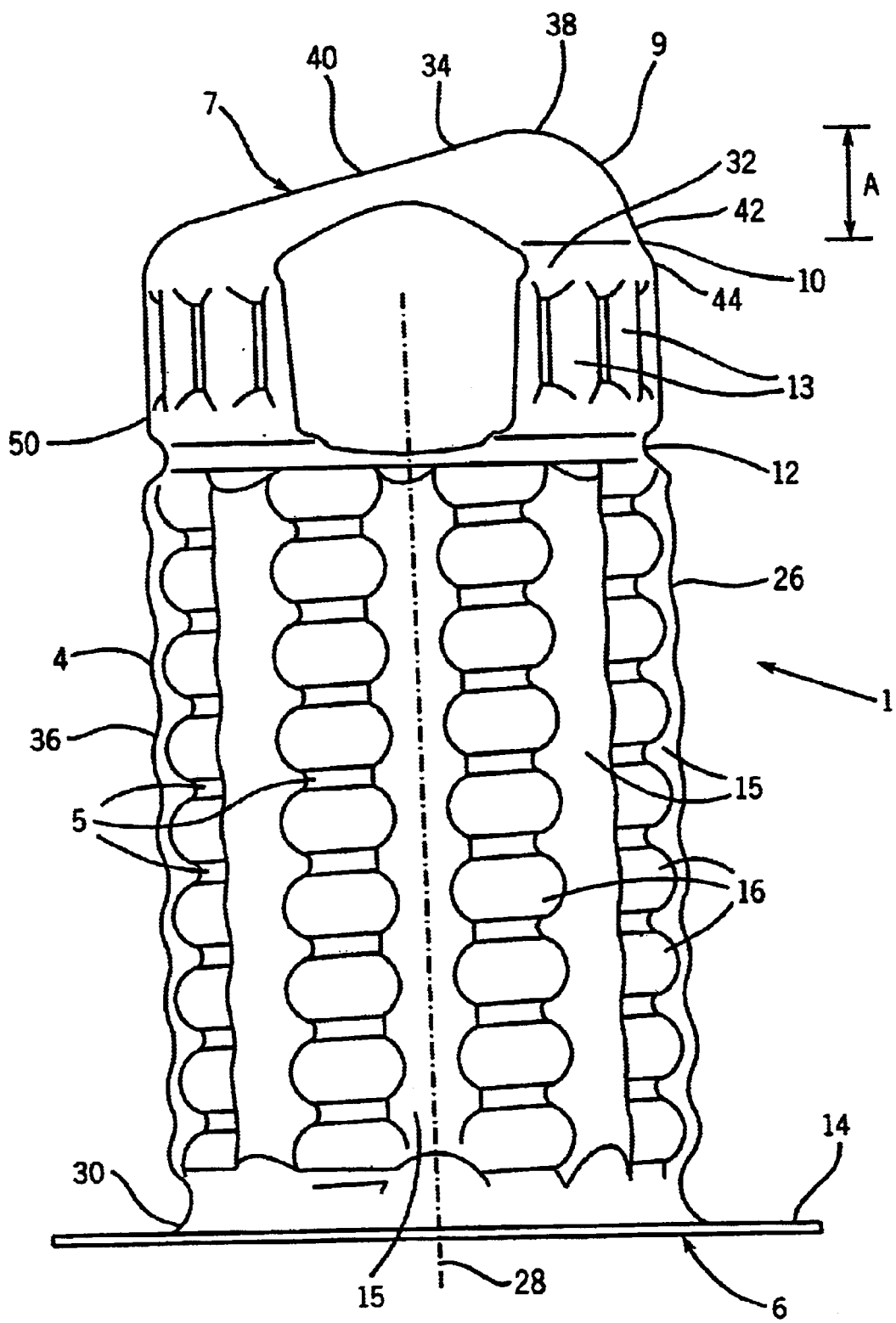
FIG. 2 illustrates the crashbox damper member of the collision damping arrangement of FIG. 1.

Crashbox damper member 26, FIGS. 1, 2, extends longitudinally along a longitudinal axis 28 between a first aft end 30 and a second distally opposite forward end 32 and is longitudinally deformably compressible in response to longitudinal force application. First end 30 of crashbox damper member 26 provides a first mounting surface 6 for mounting to the vehicle. Second end 32 of crashbox damper member 26 provides a second mounting surface 7 for mounting to a bumper-mounting surface 8 of bumper 2. Second end 32 of the crashbox damper member has a sequenced pre-collapse surface 34 providing sequential energy absorbing compression, to be described, such that at application of longitudinal force, longitudinal compression initially occurs at pre-collapse surface 34, FIG. 3, prior to compression of the remainder of crashbox damper member 26, and upon sufficient further longitudinal force, longitudinal compression of crashbox damper member 26 occurs at remaining aft portion 36. The vehicle has the noted damping longitudinal member 3 longitudinally absorbing energy. Aft end mounting surface 6 of crashbox damper member 26 is preferably mounted to longitudinal member 3, such that in combination, at application of longitudinal force, longitudinal compression initially occurs at pre-collapse surface 34, prior to compression of the remainder 36 of crashbox damper member 26, and upon sufficient further longitudinal force, longitudinal compression of the crashbox damper member occurs at 36, and upon yet further longitudinal force, compression of longitudinal member 3 occurs, for example at higher collision speeds.

Pre-collapse surface 34, FIG. 2, has a portion 7 extending at an oblique angle relative to longitudinal axis 28 and collapsingly absorbing lateral force in addition to longitudinal force, such that a collision force having both longitudinal and lateral components is at least partially absorbed by pre-collapse surface 34. Pre-collapse surface 34 is configured to absorb both longitudinal and lateral force components in a laterally shifted head-on collision. Pre-collapse surface 34 collapses asymmetrically. Crashbox damper member 26 is a hollow metal member, and surface 34 collapses asymmetrically rearwardly thereinto. The crashbox damper member has a central axis 28 extending longitudinally, and pre-collapse surface 34 is configured asymmetrically relative to central axis 28. Bumper-mounting surface 8, FIG. 1, extends at an acute angle relative to mounting surface 6. Pre-collapse surface 34 deforms in a collision such that surfaces 7 and 8 become parallel to surface 6. In preferred form, the noted forward end mounting surface 7 is the pre-collapse surface. Mounting surface 7 has a frontmost leading edge 38 over forward end 32 of the crashbox damper member and closing the hollowing interior of the latter. The crashbox damper member has a fold 10 spaced longitudinally aft of frontmost leading edge 38 by a given longitudinal distance A, such that at application of longitudinal force, compression initially occurs at fold 10, FIG. 3, prior to compression of the remainder 36 of the crashbox damper member.

The noted forward second mounting surface 7 is beveled along surface 40 in roof-like fashion to frontmost leading edge 38 over the noted forward second end 32 of crashbox damper member 26. Mounting surface 7 has a trailing portion 42 spaced aft of frontmost leading edge 38. Longitudinal distance A is the longitudinal distance between frontmost leading edge 38 and trailing portion 42. Fold 10 is a crease along a section of the perimeter 44 of the crashbox damper member and extending laterally relative to longitudinal axis 28. Mounting surface 7 is asymmetrically beveled at 40 in the noted roof-like fashion such that frontmost leading edge 38 is laterally offset from central axis 28. Mounting surface 7 is beveled along beveled surface 40 extending at an oblique angle relative to longitudinal axis 28. Beveled surface 40 is parallel to and faces and engages in flush manner the noted bumper-mounting surface 8.

Figure 4:
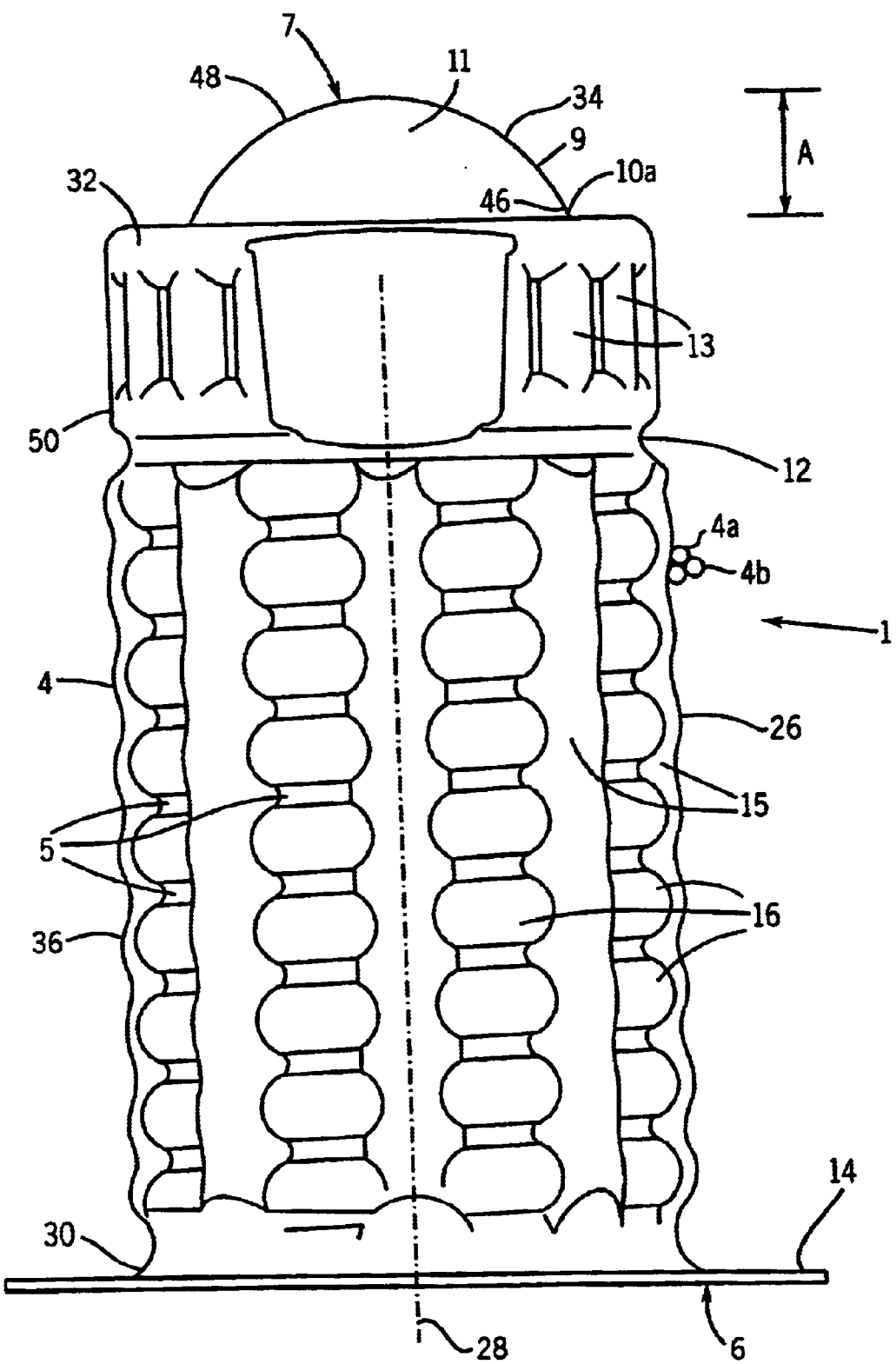
FIG. 4 shows a further embodiment of a crashbox damper member in accordance with the invention.

FIG. 4 illustrates a further embodiment, and uses like reference numerals from above where appropriate to facilitate understanding. Pre-collapse surface 34 is provided by an arched cap 11 in the form of a spherical segment over forward end 32 of crashbox damper member 26. Cap 11 has a base 46 transitioning aft to the remainder of the crashbox damper member aft thereof. A fold 10a is provided at the base, such that at application of longitudinal force, compression initially occurs at fold 10a, prior to compression of the remainder 36 of crashbox damper member 26. Cap 11 has a central axis 28 extending longitudinally, and fold 10a is spaced radially outwardly of central axis 28. Fold 10a is a crease fully encircling central axis 28 and circumscribing cap 11 at base 46. Cap 11 has portions such as 48 extending at an oblique angle relative to longitudinal axis 28 and collapsingly absorbing lateral force in addition to longitudinal force, such that a collision force having both longitudinal and lateral components is at least partially absorbed by pre-collapse surface 34 provided by cap 11. Pre-collapse surface 34 is configured to absorb both longitudinal and lateral force components in a laterally shifted head-on collision. Pre-collapse surface 34 collapses asymmetrically in such laterally shifted head-on collision. Pre-collapse surface 34 deforms in a collision such that bumper-mounting surface 8 becomes parallel to mounting surface 6. In preferred form, the noted forward mounting surface 7 provides the pre-collapse surface 34.

Crashbox damper member 26, FIGS. 2, 4, has an outer jacket 50 having a plurality of longitudinally extending ribs 13 at forward end 32 aft of the noted folds 10, 10a, and providing reinforcement and ensuring initial pre-collapse of surface 34 at folds 10, 10a. Aft mounting surface 6 extends perpendicularly to longitudinal axis 28. Crashbox damper member 26 is a hollow metal member. In the disclosed embodiment, the vehicle extends longitudinally along longitudinal axis 28 between a front end and a rear end, and bumper 2 is at one of such front and rear ends of the vehicle. Longitudinal axis 28 is in the direction of propulsion of the vehicle. In another embodiment, longitudinal axis 28 is non-parallel to the direction of propulsion of the vehicle, and preferably longitudinal axis 28 is perpendicular to the direction of propulsion of the vehicle, and crashbox damper member 26 provides side impact protection.

As noted above, crashbox damper member 26 is a hollow metal member 4 preferably having the noted perpendicular first mounting surface 6 for mounting to vehicle longitudinal member 3 or another structural component of the vehicle body. On the opposite second end 32, there is a second mounting surface 7 for mounting the crashbox damper member to an opposite surface 8 of bumper cross member 2 or another structural component of the vehicle body. Hollow member 4 is essentially closed at second end 32. Second mounting surface 7 permits the mounting of bumper cross member 2 to the hollow member 4 by means of the opposite surface 8 extending at an acute angle to first mounting surface 6. This allows registration of the strake of the bumper cross member 2 and its usually complexly arched course across the width of the vehicle body, which results in opposite surface 8 forming an acute angle with first mounting surface 6. This is taken into account by the orientation of the second mounting surface 7 of hollow member 4. Hollow member 4 has deformation creases 5 in its outer jacket 50.

Figure 3:
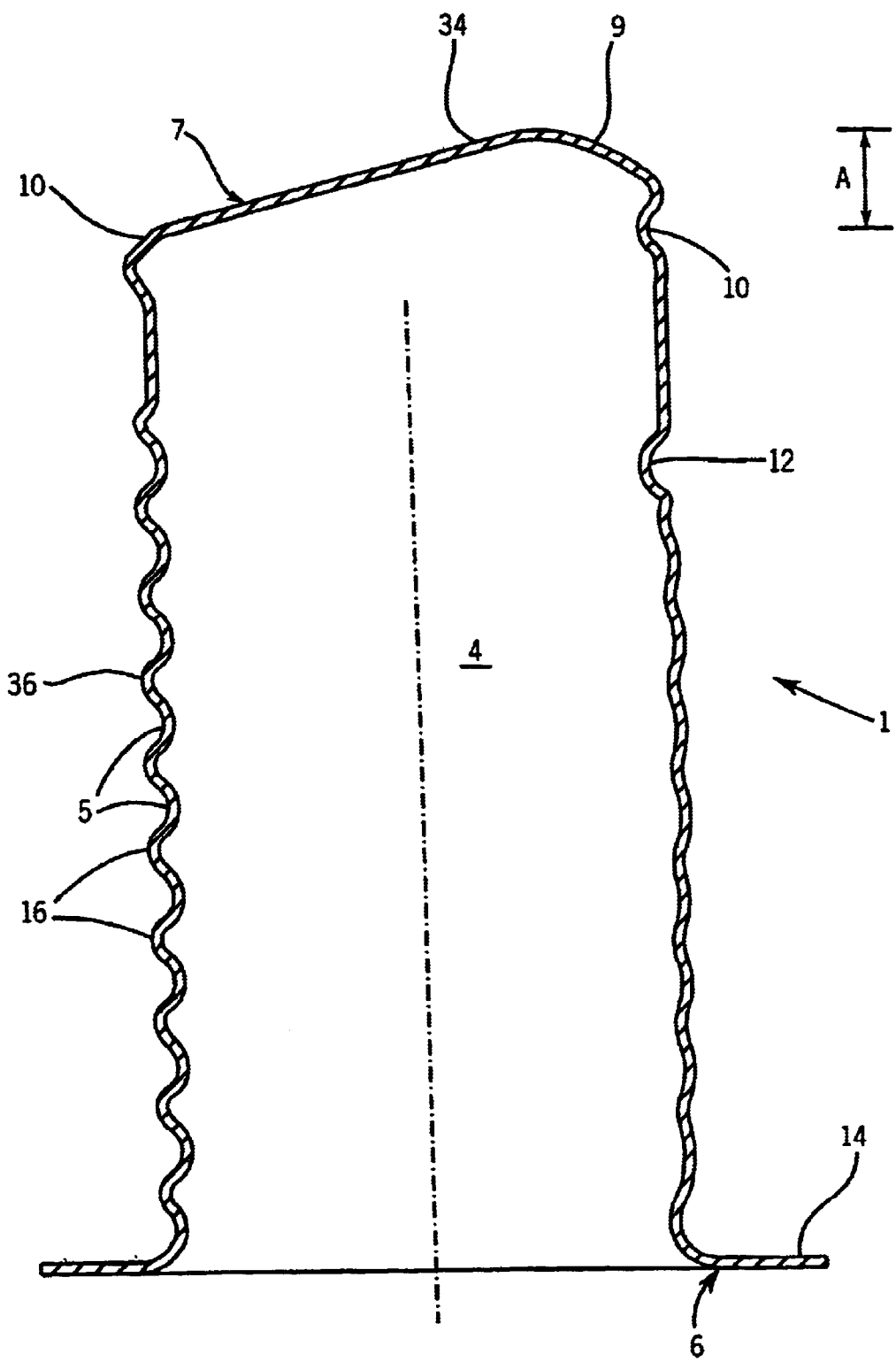
FIG. 3 shows another embodiment of a crashbox damper member in accordance with the invention.

In the embodiment of FIGS. 1–3, second mounting surface 7 is the front surface of hollow member 4 inclined in accordance with the noted acute angle. Hollow member 4 features an end section 9 beveled in an asymmetrical roof-like fashion forming the second mounting surface 7. In the outer jacket of the hollow member there is the noted fold 10 longitudinally aft of frontmost edge 38 of second mounting surface 7 and set back therefrom in the longitudinal direction by the noted distance A. Upon application of longitudinal force at point 38, compression occurs at fold 10 for the initial moment, without the rest of hollow member 4 being compressed. Due to the installation and orientation of the crashbox damper member relative to bumper cross member 2, with second mounting surface 7 progressing in accordance with parallel opposite surface 8 at bumper cross member 2, the greatest force application in a collision occurs on frontmost edge 38 of second mounting surface 7, at the onset of the collision. This occurs both for laterally shifted head-on collisions and for central longitudinally aligned head-on collisions. Bumper cross member 2 curves forwardly away from the vehicle (upwardly in FIG. 1) as it curves toward the center of the vehicle (rightwardly in FIG. 1) in an arched fashion in accordance with the strake and is first dislocated in the area of frontmost edge 38 of second mounting surface 7 by a preliminary path along the longitudinal direction 28 of hollow member 4, whereby at first only the end section 9 of hollow member 4 is pressed together. The rest of hollow member 4 remains essentially unchanged. The compression of hollow member 4 in the longitudinal direction starts only after bumper cross member 2 has been significantly dislocated towards the center, when the forces acting laterally or perpendicularly to crashbox damper member 26 along longitudinal axis 28 have been partially neutralized. Subsequently, hollow member 4 is compressed in the longitudinal direction 28 and thus fulfills its protective function for the passenger compartment.

In FIGS. 2 and 3, fold 10 is provided on the right side of end section 9 at a distance A from the front edge 38 of second mounting surface 7. When a force is applied longitudinally in the direction of the first mounting surface 6, the material gives way at folds 10 to the inside (leftwardly in FIGS. 2 and 3) and the roof-like bevel of end section 9 disappears. The rest of hollow member 4 remains largely intact. Subsequently, a compression of hollow member 4 in the longitudinal direction occurs.

In FIG. 4, instead of end section 9 beveled in a n asymmetrical roof-like fashion, the collision damping arrangement features the noted arched cap 11, designed in the shape of a spherical segment, which closes hollow member 4 at second end 32 and forms the second mounting surface 7. Cap 11 allows opposite surface 8 of bumper 2 to be mounted to hollow member 4 at any desired angle, thus approximating the function of a swivel pin in the art, without the disadvantages of the latter. The connection can also be realized by means of welding or bolting. A suitable fold 10a is recommended in the embodiment of FIG. 4 at the base 46 of cap 11 in the transition to hollow member 4, preferably in the noted jacket of the hollow member, such that when force is applied at cap 11, compression occurs at the cap for the initial moment, without the rest of hollow member 4 being compressed. In the disclosed embodiment, fold 10a at base 46 of cap 11 is located within the outer perimeter of the jacket of hollow member 4. Fold 10a causes cap 11 to be pushed inside the hollow member 4 in the case of asymmetrical application of force, including longitudinal and lateral components, at the onset of deformation.

In each of the disclosed embodiments, it is preferred that end section 9 of hollow member 4 be set apart from the rest of hollow member 4 by a fully encircling crease 12. It is also preferred that the jacket of hollow member 4 in its end section 9 have reinforcing ribs 13 extending longitudinally between fold 10, 10a and crease 12. This results in the end section 9 of hollow member 4 forming an area which is relatively stiff in the longitudinal direction and which can only be compressed by the application of increased force after roof-like beveled end surface 34 is pressed into hollow member 4, i.e. surface 34 is deformably compressed before the remaining portion 36 of crashbox damper member 26 is compressed in the longitudinal direction 28. Hollow member 4 includes a mounting flange 14 protruding to the outside (leftwardly in the Figures) and to the inside (rightwardly in the Figures) for the purpose of providing first mounting surface 6. In one preferred form, hollow member 4 features at least three bridge-like areas 15 distributed evenly over its circumference and extending longitudinally, and at least three parallel reinforcing creases 5 arranged between adjacent bridge-like areas 15 in the jacket of the hollow member 4, extending in the direction of the circumference and directed towards the interior of hollow member 4, in such a fashion that, looking from the axial longitudinal direction, convex areas 16 are formed between adjacent reinforcing creases 5. In such embodiment, circumferentially adjacent convex areas 16 encircle the longitudinal axis of hollow member 4 in the form of a helix, or alternatively a circular arrangement is also possible. In a further alternative, hollow member 4 can feature in its jacket a convex deformation crease 5 with a helical course with at least two windings 4a, 4b encircling hollow member 4. Hollow member 4 is preferably cylindrical, though other shapes are possible such as oval, square, polygonal, if their feasibility is confirmed in practical application.

It is recognized that various equivalents, alternatives and modifications are possible within the scope of the appended claims.

What is claimed is:

1. A collision damping arrangement for a motor vehicle for absorbing energy in a collision, comprising a crashbox damper member extending longitudinally along a longitudinal axis between a first aft end and a second distally opposite forward end and longitudinally deformably compressible in response to longitudinal force application, said first end of said crashbox damper member providing a first mounting surface for mounting to said vehicle, said second end of said crashbox damper member providing a second mounting surface for mounting to a bumper-mounting surface of a bumper, said second end of said crashbox damper member having a sequenced pre-collapse surface providing sequential energy absorbing compression such that at application of longitudinal force, longitudinal compression initially occurs at said pre-collapse surface, prior to compression of the remainder of said crashbox damper member, and upon sufficient further longitudinal force, longitudinal compression of said crash box damper member occurs, wherein said second mounting surface is beveled in roof-like fashion to a frontmost leading edge over said second end of said crashbox damper member, said crashbox damper member having a fold spaced longitudinally aft of said frontmost leading edge of said second mounting surface by a given longitudinal distance, such that at application of longitudinal force, compression initially occurs at said fold, prior to compression of the remainder of said crashbox damper member, said pre-collapse surface being provided by said second mounting surface.

2. The collision damping arrangement according to claim 1 wherein said second mounting surface has a trailing portion spaced aft of said frontmost leading edge, and wherein said given longitudinal distance is the longitudinal distance between said frontmost leading edge and said trailing portion.

3. The collision damping arrangement according to claim 1 wherein said fold is a crease along a section of the perimeter of said crashbox damper member and extending laterally relative to said longitudinal axis.

4. The collision damping arrangement according to claim 1 wherein said crashbox damper member has a central axis extending longitudinally, and said second mounting surface is asymmetrically beveled in said roof-like fashion such that said frontmost leading edge is laterally offset from said central axis.

5. The collision damping arrangement according to claim 1 wherein said beveled surface is parallel to and faces said bumper-mounting surface.

6. A collision damping arrangement for a motor vehicle for absorbing energy in a collision, comprising a crashbox damper member extending longitudinally along a longitudinal axis between a first aft end and a second distally opposite forward end and longitudinally deformably compressible in response to longitudinal force application, said first end of said crashbox damper member providing a first mounting surface for mounting to said vehicle, said second end of said crashbox damper member providing a second mounting surface for mounting to a bumper-mounting surface of a bumper, said second end of said crashbox damper member having a sequenced pre-collapse surface providing sequential energy absorbing compression such that at application of longitudinal force, longitudinal compression initially occurs at said pre-collapse surface, prior to compression of the remainder of said crashbox damper member, and upon sufficient further longitudinal force, longitudinal compression of said crash box damper member occurs, wherein said second mounting surface is an arched cap in the form of a spherical segment over said second end of said crashbox damper member, and wherein said second mounting surface is said pre-collapse surface, and wherein said cap has a base transitioning aft to the remainder of said crashbox damper member aft thereof, and comprising a fold at said base, such that at application of longitudinal force, compression initially occurs at said fold, prior to compression of the remainder of said crashbox damper member.

7. The collision damping arrangement according to claim 6 wherein said cap has a central axis extending longitudinally, and wherein said fold is spaced radially outwardly of said central axis.

8. The collision damping arrangement according to claim 7 wherein said fold is a crease fully encircling said central axis and circumscribing said cap.

9. A collision damping arrangement for a motor vehicle for absorbing energy in a collision, comprising a crashbox damper member extending longitudinally along a longitudinal axis between a first aft end and a second distally opposite forward end and longitudinally deformably compressible in response to longitudinal force application, said first end of said crashbox damper member providing a first mounting surface for mounting to said vehicle, said second end of said crashbox damper member providing a second mounting surface for mounting to a bumper-mounting surface of a bumper, said second end of said crashbox damper member having a sequenced pre-collapse surface providing sequential energy absorbing compression such that at application of longitudinal force, longitudinal compression initially occurs at said pre-collapse surface, prior to compression of the remainder of said crashbox damper member, and upon sufficient further longitudinal force, longitudinal compression of said crash box damper member occurs, wherein said crashbox damper member is a hollow member having at least three bridge areas distributed evenly around its perimeter and extending longitudinally, and at least three parallel reinforcing creases arranged between said bridge areas and extending in the direction of said perimeter and directed towards the interior of said hollow member in such a fashion that, looking from the longitudinal direction, convex areas are formed between adjacent reinforcing creases.

10. The collision damping arrangement according to claim 9 wherein said hollow member has a central longitudinal axis, and wherein circumferentially adjacent said convex areas encircle said longitudinal axis of said hollow member in a helical fashion.

11. The collision damping arrangement according to claim 9 wherein said hollow member has a central longitudinal axis, and wherein circumferentially adjacent said convex areas encircle said longitudinal axis of said hollow member in a circular fashion.

12. A collision damping arrangement for a motor vehicle for absorbing energy in a collision, comprising a crashbox damper member extending longitudinally along a longitudinal axis between a first aft end and a second distally opposite forward end and longitudinally deformably compressible in response to longitudinal force application, said first end of said crashbox damper member providing a first mounting surface for mounting to said vehicle, said second end of said crashbox damper member providing a second mounting surface for mounting to a bumper-mounting surface of a bumper, said second end of said crashbox damper member having a sequenced pre-collapse surface providing sequential energy absorbing compression such that at application of longitudinal force, longitudinal compression initially occurs at said pre-collapse surface, prior to compression of the remainder of said crashbox damper member, and upon sufficient further longitudinal force, longitudinal compression of said crash box damper member occurs, wherein said second mounting surface is said pre-collapse surface, and wherein said second mounting surface has a frontmost leading edge over said second end of said crashbox damper member, said crashbox damper member having a fold spaced longitudinally aft of said frontmost leading edge of said second mounting surface by a given longitudinal distance, such that at application of longitudinal force, compression initially occurs at said fold, prior to compression of the remainder of said crashbox damper member.

13. A collision damping arrangement for a motor vehicle for absorbing energy in a collision, comprising a crashbox damper member extending longitudinally along a longitudinal axis between a first aft end and a second distally opposite forward end and longitudinally deformably compressible in response to longitudinal force application, said first end of said crashbox damper member providing a first mounting surface for mounting to said vehicle, said second end of said crashbox damper member providing a second mounting surface for mounting to a bumper-mounting surface of a bumper, said second end of said crashbox damper member having a sequenced pre-collapse surface providing sequential energy absorbing compression such that at application of longitudinal force, longitudinal compression initially occurs at said pre-collapse surface, prior to compression of the remainder of said crashbox damper member, and upon sufficient further longitudinal force, longitudinal compression of said crash box damper member occurs, wherein said pre-collapse surface has a frontmost leading edge over said second end of said crashbox damper member, said crashbox damper member has a fold spaced longitudinally aft of said frontmost leading edge by a given longitudinal distance, such that at application of longitudinal force, compression initially occurs at said fold, prior to compression of the remainder of said crashbox damper member, and said crashbox damper member has an outer jacket having a plurality of longitudinally extending ribs at said second end aft of said fold.

14. A collision damping arrangement for a motor vehicle for absorbing energy in a collision, comprising a crashbox damper member extending longitudinally along a longitudinal axis between a first aft end and a second distally opposite forward end and longitudinally deformably compressible in response to longitudinal force application, said first end of said crashbox damper member providing a first mounting surface for mounting to said vehicle, said second end of said crashbox damper member providing a second mounting surface for mounting to a bumper-mounting surface of a bumper, said second end of said crashbox damper member having a sequenced pre-collapse surface providing sequential energy absorbing compression such that at application of longitudinal force, longitudinal compression initially occurs at said pre-collapse surface, prior to compression of the remainder of said crashbox damper member, and upon sufficient further longitudinal force, longitudinal compression of said crash box damper member occurs, wherein said crashbox damper member is a hollow member having a jacket with a convex deformation crease with a helical course having at least two windings encircling said hollow member.

* * * * *